E. M. ROSENBLUTH.
ACETYLENE GAS GENERATOR.
APPLICATION FILED AUG. 12, 1913.
1,140,853.
Patented May 25, 1915.
3 SHEETS—SHEET 1.
FIG. I.
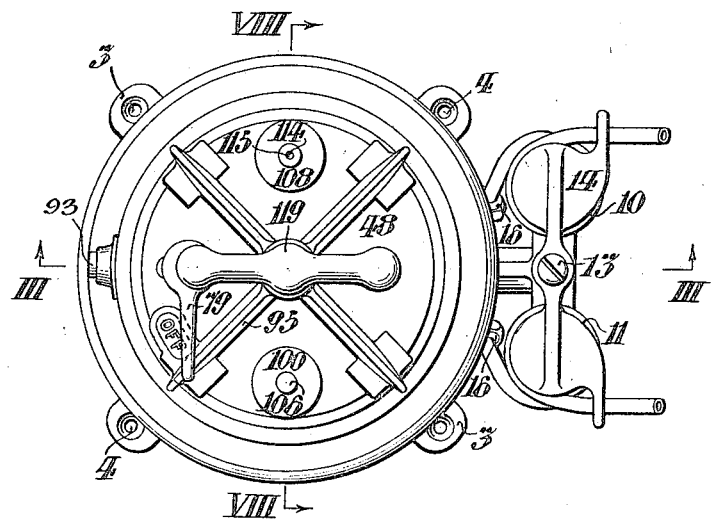
FIG. II.
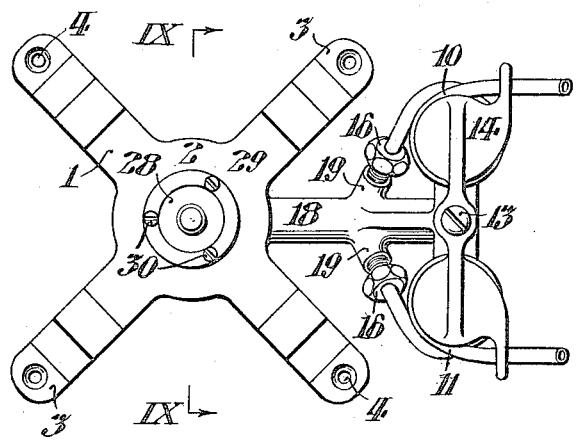
WITNESSES:
Philip W. Vessey
Joseph C. Segal
INVENTOR:
Edwin M. Rosenbluth
By Arthur E. Paige
Attorney.

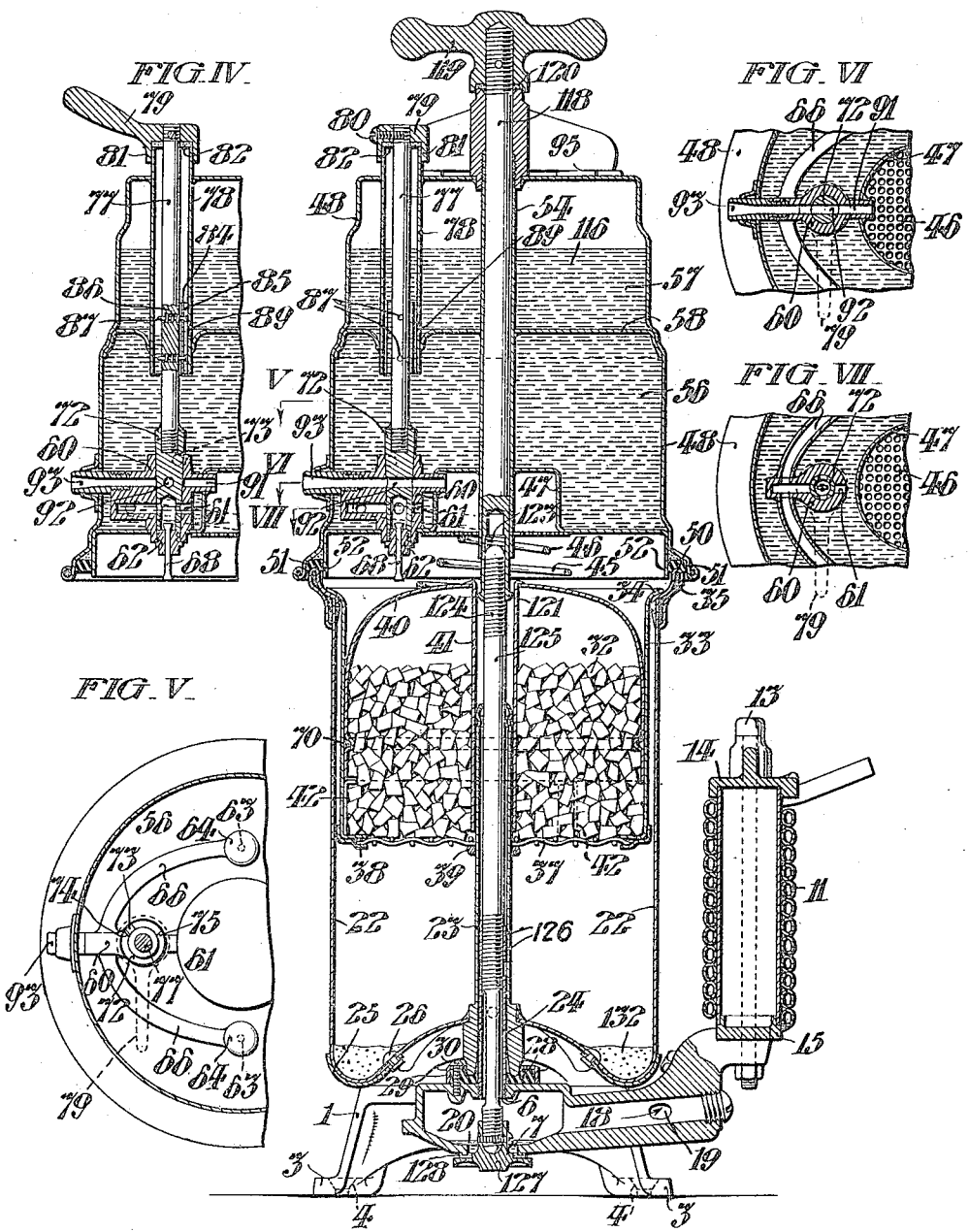

E. M. ROSENBLUTH.
ACETYLENE GAS GENERATOR.
APPLICATION FILED AUG. 12, 1913.
1,140,853.
Patented May 25, 1915.
3 SHEETS—SHEET 3.
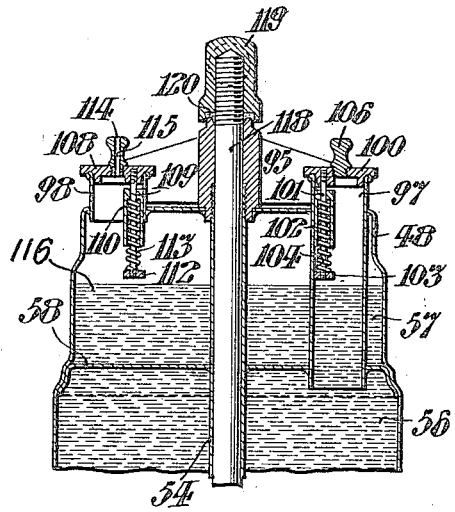
FIG. VIII.
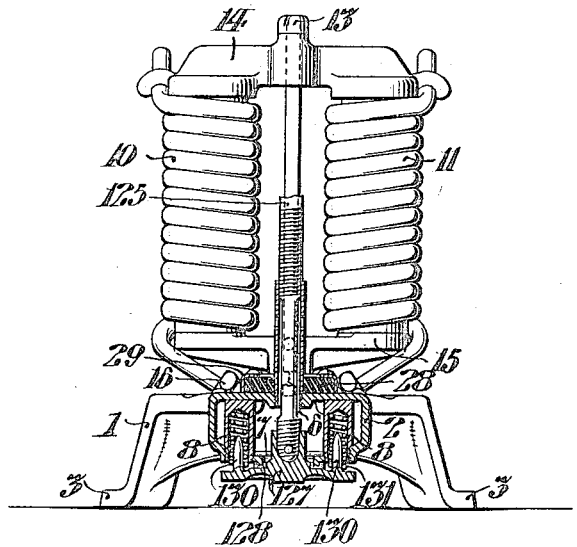
FIG. IX.
WITNESSES:
Philip W. Vessey,
Joseph C. Segal.
INVENTOR:
Edwin M. Rosenbluth
by Arthur C. Paige
Attorney.

UNITED STATES PATENT OFFICE.

EDWIN M. ROSENBLUTH, OF PHILADELPHIA, PENNSYLVANIA.

ACETYLENE-GAS GENERATOR.

1,140,853.  Specification of Letters Patent.  Patented May 25, 1915.

Application filed August 12, 1913. Serial No. 784,292.

*To all whom it may concern:*

Be it known that I, EDWIN M. ROSENBLUTH, a citizen of the United States, residing at Philadelphia, in the county of Philadelphia and State of Pennsylvania, have invented a certain new and useful Improvement in Acetylene-Gas Generators, whereof the following is a specification, reference being had to the accompanying drawings.

My invention relates to a gas generator of the type described in Letters Patent of the United States 1,025,648, granted to me May 7, 1912 and provides such a generator with means for automatically draining the condensate from its gas discharge passage ways each time the carbid chamber of the generator is opened; thus insuring that the condensate shall be discharged from the generator at least as often as the generator is charged with carbid.

As hereinafter described, my invention includes a generator so constructed that its base frame may be permanently attached to an automobile and the carbid casing and water receptacle be detachably rigidly connected therewith by rotation of a rod extending centrally through said water receptacle, in threaded engagement with a screw threaded stem extending through said carbid casing from said base; said stem extending through a condensate trap in said base and carrying at its lower end a closure for a vent opening in the bottom of said trap; said closure being spring pressed so as to be automatically opened whenever said stem is released by rotation of said connecting rod. As hereinafter described, said water receptacle includes a main compartment adjacent the carbid chamber and an auxiliary compartment above said main compartment; and a water passageway leading from said main water compartment into the carbid casing is controlled by a rotary valve which also controls a gas passageway leading from said carbid casing to the atmosphere, the construction and arrangement being such that when the gas passageway is opened the water passageway is closed and vice versa; said valve being rotatable by a rod extending from the main water compartment through the auxiliary water compartment and having an operating handle exterior to the latter, and said rod carrying a valve controlling communication between said auxiliary compartment and said main compartment so as to place them in communication only when said water passageway leading from said main compartment to said carbid casing is closed.

Ordinarily the water receptacles in generators of this class are so constructed and arranged that when filled to their maximum capacity the height of the water column therein is as great as can be advantageously employed in view of the gravitative nature of the feed. That is to say, if a water column of a greater height were employed, water would be supplied to the carbid at a more rapid rate than is required to decompose the carbid in the most efficient production of gas. However, it is desirable to carry a greater supply of water than is permissible by said ordinary conditions. Therefore, the arrangement herein described and claimed is advantageous in that it increases the water carrying capacity of the generator without increasing the water pressure effective for feeding, and maintains the latter more uniformly, because when the water passage way to the carbid chamber is closed in the inoperative condition of the generator, the main water compartment is refilled, automatically, by the reserve supply from the auxiliary chamber so as to restore the water column in the main compartment to its initial height.

My invention also includes the various novel features of construction and arrangement hereinafter more definitely specified:—

In the drawings: Figure I is a plan view of a generator conveniently embodying my invention. Fig. II is a plan view of the base of said generator from which the carbid casing and water receptacle have been removed. Fig. III is a vertical sectional view of said generator taken on the line III, III in Fig. I. Fig. IV is a fragmentary sectional view on the same line as Fig. III but showing a different position of the rotary valve. Fig. V is a fragmentary horizontal sectional view taken on the line V in Fig. III. Fig. VI is a fragmentary horizontal sectional view taken on the line VI in Fig. III. Fig. VII is a fragmentary horizontal sectional view, taken on the line VII in Fig. III. Fig. VIII is a vertical fragmentary sectional view, taken on the line VIII, VIII in Fig. I. Fig. IX is a fragmentary vertical sectional view, taken on the line IX, IX, in Fig. II.

In said drawings; the generator has the base 1 including the condensate trap 2 cast in unitary relation with the feet 3 having the openings 4 by which it may be permanently connected with an automobile or other vehicle. Said trap has a gas inlet 6 at the top thereof and a condensate outlet 7 at the bottom thereof and two eccentric sockets 8 at the bottom thereof, shown in Fig. IX. The two branch condensing coils 10 and 11 which are carried by said base 1, to which they are detachably secured by the bolt 13 and yokes 14 and 15, have means including the nuts 16 detachably connecting said coils in communication with said trap 2 by way of ducts 18 and 19. It is to be understood that the moisture entrained in the gas passing from said inlet 6 and through the trap 2 and said coils 10 and 11 is condensed and the condensate gravitates to the bottom of said trap 2 as indicated at 20 in Fig. III.

The carbid casing 22, having the central tubular column 23 and the gas outlet 24 at the bottom thereof, is reinforced by the spider frame 25, which is conveniently riveted thereon as indicated at 26 in Fig. III, and is detachably fitted to said base 1; the latter having the resilient gasket 28 surrounding said gas inlet 6 and retained by the ring 29 held by the screw 30 engaging said base 1, as shown in Fig. III, so as to seal the joint between said gas outlet 24 of the carbid casing 22 and the gas inlet 6 of the generator base 1. The carbid 32 is supported in said carbid casing 22 in the removable basket 33 having its annular top flange 34 resting upon the annular top flange 35 of said carbid casing 22, and said basket has the foraminous bottom 37, conveniently formed of wire fabric held by the annular flange 38 and having a central aperture, fitted to said carbid casing column 23, reinforced by the ring 39 which is soldered to said fabric. The carbid 32 is retained in said basket 33 by the removable cap 40 which fits therein as shown in Fig. III and has the central tubular column 41 which fits over said column 23 of the carbid casing. The downward movement of said cap 40 in said basket 33 is limited by three stop lugs 42 which are stationary in said basket and one of which is shown on the left hand side of Fig. III. Said cap is held in said basket and prevented from rattling by the spiral spring 45, the lower end of which is connected with said cap, by solder, and the upper end of which bears upon the foraminous floor 46 of the gas dome 47 which extends into the water receptacle 48 and forms part of the bottom of the latter. Said water receptacle 48 is arranged to detachably fit upon said carbid casing 22, and has the resilient gasket 50 held between its bottom flanges 51 and 52 resting upon said top flange 35 of the carbid casing 22 so as to seal the joint between said carbid casing and said water receptacle 48. Said water receptacle has the central tubular column 54 in axial alinement with the column 23 in said carbid casing, and includes the main compartment 56, adjacent said casing, and the auxiliary compartment 57 above said main compartment, said compartments being separated by the diaphragm 58. The valve casing 60 which is permanently set in the bottom of said main compartment 56 of the water receptacle has the water inlet passageway 61 leading to the restricted water outlet 62 in the bottom of said valve casing and to the similar restricted water outlets 63 in fittings 64 which are also permanently set in the bottom of said compartment 56 as indicated in Fig. V and connected with said valve casing 60 by the branch tubes 66. Each of said water outlets 62 and 63 is conveniently provided with a reciprocatory plunger 68 such as shown in Fig. III, arranged to restrict the flow of water and to be longitudinally shifted to free any obstruction which may lodge in said outlets. It is to be understood that when said passageway 61 is in communication with said outlets 62 and 63 water is permitted to drip through said outlets upon the rounded top of the cap 40 and flows down the latter between its vertical wall and the vertical wall of the basket 33 and is distributed circumferentially thereon by the bead 70 from which it flows in a thin film to the carbid 32. Said water passageway 61 is controlled by the valve plug 72 which is mounted to turn in said valve casing 60 to the degree limited by the stud 73 on said plug encountering the shoulders 74 and 75 on said casing, which are shown in Fig. V. Said valve plug 72 is provided with a stem 77 extending through the tube 78 which is permanently secured in said diaphragm 58 and in the top of the water receptacle 48 and is provided above the latter with the operating handle 79 which is detachably secured thereon by the screw 80.

It may be observed, with reference to Fig. III, that said handle 79 has a flange 81 overhanging the top of said tube 78 and the joint between them is sealed by the resilient gasket 82. As best shown in Fig. IV, said valve stem 77 also carries the valve 84 which has a face of resilient material 85 (for instance leather) bearing upon the inner face of said tube 78 toward which said valve 84 is pressed by the springs 86 which surround the studs 87 extending through said valve stem 77. Said valve 84 is provided to control the water passageway 89 leading from said auxiliary water compartment 57 to the main water compartment 56, and it may be observed that the construction and arrangement is such that when the water passageway 61 from the main compartment to the carbid casing is closed, the water passageway 89 leading from said auxiliary compartment to said main compartment is opened as shown in Fig. III, and vice versa as shown in Fig. IV. Moreover, I provide a gas passageway from said carbid casing 22 to the atmosphere, controlled by the same valve means, so that any gas generated after the water is shut off at said passageway 61 may escape directly to the atmosphere instead of through said condensing coils 10 and 11 to the lamps. Said passageway is shown at 91 in Fig. IV, extending from the gas dome 47 through said valve casing 60 and the port 92 in said valve plug 72 and terminating in the gas vent nozzle 93 exterior to the water receptacle 48, and is closed when said plug is turned to open said passageway 61 as shown in Fig. IV. Therefore, it may be observed that the generator above described includes a gas passageway from said carbid casing to the atmosphere; a water passageway leading from said main compartment of the water receptacle into said carbid casing; a water passageway from said auxiliary compartment in the water receptacle to said main compartment, and valve means controlling said gas and water passageways, so constructed and arranged that when the gas passageway is opened, the water passageway between said compartments is opened and the water passageway from said main compartment to said carbid casing is closed, and vice versa.

Referring to Figs. I, III, IV and V, it may be observed that the position of said valve means and consequent operative or inoperative condition of the generator is manifested by the position of the exterior operating handle 79, which in Figs. I, III and V is in the position to shut off the supply of water from the water receptacle to the carbid casing, as indicated by said handle registering with the sign " Off " which is cast in unitary relation with the spider frame 95 which is permanently set in the top of the water receptacle shown in Figs. I and III. As shown in Figs. I and VIII, the water receptacle 48 is provided with two inlets or filler tubes 97 and 98. Said tube 97 extends from the exterior of said receptacle 48 through the top thereof and through the diaphragm 58 into the main water compartment 56 and is provided with the closure 100 which is eccentrically pivotally connected with said tube 97 by the pintle 101, which extends through the bearing 102 which is stationary in the receptacle 48. Said pintle carries at its lower end the abutment 103 for the spring 104 which encircles said pintle and tends to press said closure 100 shut, as shown in Fig. VIII. It is to be understood that when it is desired to fill said main water compartment 56 in the water receptacle 48, said closure 100 may be raised by its knob 106 and turned aside to uncover said tube 97 to permit water to be poured therein, and when said closure is returned to registry with said tube 97 it is tightly shut thereon by said spring 104. Said tube 98 extends from the exterior of said receptacle 48 through the top thereof to the auxiliary water compartment 57, and is provided with a closure 108 which is eccentrically pivotally connected with said tube 98 by the pintle 109 extending through the bearing 110, which is stationary in the receptacle 48. Said pintle carries at its lower end the abutment 112 for the spring 113 which encircles said pintle and tends to press said closure 108 shut, as shown in Fig. VIII. It is to be understood that when it is desired to fill said auxiliary water compartment 57 in the water receptacle 48 said closure 108 may be raised by its knob 114 and turned aside to uncover said tube 98 to permit water to be poured therein, and when said closure is returned to registry with said tube 98 it is tightly shut thereon by said spring 113.

It may be observed, with reference to Figs. I and VIII, that said knob 114 of the closure 108 has an opening 115 extending therethrough maintaining communication between the interior of said auxiliary water compartment 57 and the outer atmosphere so as to avoid the creation of a partial vacuum by the subsidence of the water 116 in the receptacle 48, which might interfere with the gravitative feed of the water to the carbid.

Means are provided for detachably rigidly connecting said carbid casing 22 and water receptacle 48 with said base 1, including the screw threaded rod 118 depending in said water receptacle column 54 from the top thereof, having the operating handle 119 provided with the resilient gasket 120 bearing upon the top of said spider frame 95 and sealing the joint thereat. As shown in Fig. III, said rod 118 has the annular flange 121 at its lower end preventing it from being withdrawn outwardly from said water receptacle 48, but permitting it to reciprocate longitudinally to a limited extent sufficient to facilitate the engagement of the screw thread 123 at the lower end of said rod 118, with the screw thread 124 at the upper end of the stem 125 which extends in the carbid casing column 23 from the base 1. As shown in Fig. III, said stem 125 extends through said trap 2, has the jam nuts 126 to limit its downward movement by contact with the top of said gas outlet 24, and carries at its lower end the closure 127 for said condensate outlet 7; said closure 127 carrying the resilient gasket 128 to seal said outlet when the connection between said rod 118 and stem 125, is tightened by rotation of said handle 119. In order to prevent rotation of said stem 125 when engaged by said rod 118, said closure is provided with two eccentric studs 130 extending in said socket 8 in the base 1, which hold the springs 131 pressing upon said closure 127 so as to automatically open the latter when said stem 125 is released by said rod 118.

The generator above described is operated as follows: The generator being charged with carbid in the basket 33 and both compartments 56 and 57 filled with water, and the valve handle 79 being turned to the position shown in Figs. I and V, the generator is in inoperative position because the water passageway 61 leading from the receptacle 48 to the carbid casing 22 is closed and the gas passageway leading from the carbid casing 22 to the atmosphere is open, as shown in Fig. III. In this position, the water passageway 89, leading from the auxiliary water compartment 57 to the main compartment 56 is open and, said auxiliary compartment being in communication with the atmosphere through the opening 115 in the knob 114 of the closure 108, the water 116 is free to subside and entirely fill the main water compartment 56. It being desired to operate the generator, the valve handle 79 is turned from the position shown in Figs. I and V to the position shown in Fig. IV, through an arc of 90 degrees, its motion being limited by the circumferential length of the recess in the valve casing 60 in which the stud 73 extends as shown in Fig. V. Thereupon, the water passageway 61 leading from the main water compartment 56 to the restricted outlets 62 and 63 being open, the water gravitates through said outlets upon the cap 40 and thence to the carbid 32, decomposing the latter and generating gas which is forced by its own pressure through the columns 41 and 23, the interstices between the gas inlet tube 6 of the base 1 and the stem 125 of the closure 127 and through said gas outlet 24 into the trap 2 and thence through the ducts 18 and 19 to the condensing coils 10 and 11 and thence to the lamps or other gas consuming devices connected to the upper end of said coils, conveniently by flexible rubber tubes.

The ash residue 132 of the decomposition of the carbid 32 falls through the foraminous floor 37 of the carbid basket 33 to the bottom of the carbid casing 22 as indicated in Fig. III, and the condensate from the gas gravitates to the bottom of the trap 2 as indicated at 20 in said figure.

If the operation of the generator is continued, without shutting off the water feed, (by returning the valve handle 79 to the initial position shown in Fig. I,) the water may be exhausted from the main compartment 56 to the level of the bottom of the water passageway 61. However, during such operation, the gas pressure would gradually diminish because of the diminishing rate at which the water would gravitate through the outlets 62 and 63, consequent upon the lessening height and consequent pressure of the water in the main compartment 56; and such diminution in pressure would be manifest by the lessening brilliance of the flames of the lamps. It may be observed that such diminishment in the gas pressure is characteristic of all generators which have a single supply of water the pressure of which diminishes as the water is consumed in decomposing the carbid. However, with my improved construction above described, the water pressure may be repeatedly restored to its original amount by momentarily returning the valve handle 79 to the "off" position shown in Fig. I, thus permitting the water from the auxiliary compartment 57 to recharge the main compartment 56 to its initial full extent. Such procedure does not extinguish the lights at any burners connected with the generator, because the generation of gas continues until so much of the carbon as has been moistened is decomposed by reaction with its contained moisture. Moreover, it may be observed that when the valve is in said "off" position, the water rises in the column 78 to the level of the water in the upper auxiliary compartment 57, so that when the valve handle 79 is turned to the position shown in Fig. IV, which is the gas generating position, the initial pressure of the water is that incident to the height of the water in the main compartment 56 plus the height of the water in the column 78; but the latter only holds a small quantity of water which quickly subsides to the level of the water in the lower main compartment 56, when the valve 84 is closed as shown in Fig. IV. The effect of such construction and arrangement is that each time the water is turned on to the carbid, it is initially fed to the latter at a rate much higher than the normal rate so as to instantly generate sufficient gas to fill the gas spaces in the apparatus and provide sufficient gas pressure at the lamps to properly illuminate the latter.

When it is desired to extinguish the lamps, the valve lever 79 is returned to the "off" position, shown in Fig. I, so as to shut off the water, but the residue of water in the carbid 32 would continue the generation of gas at a gradually diminishing rate for perhaps several minutes, and the lamps would remain lighted if it were not that the gas passageway 91 is then opened to the atmosphere so that the gas escapes therethrough and the lamps are instantly extinguished.

It may be observed that whenever it is desired to recharge the generator with carbid 32, it is necessary to disconnect the rod 118 from the stem 125 by rotating said rod by the handle 119 thus releasing said stem and, upon such release, the closure 127 is automatically opened by the springs 131 so as to automatically discharge the condensate from the trap 2. Consequently, it is impossible to have the generator obstructed by accumulated condensate which might occur if such discharge were not thus automatically effected. Said rod 118 being disconnected, as above described, the water receptacle 48 may be lifted by the handle 119, the bottom flange 121 on said rod engaging the lower end of the column 54 of said receptacle. The cap 40 being thus released from the pressure of its spring 45, may be removed from the carbid basket 33 and the latter removed from the carbid casing 22 and the latter may also be uplifted and thus removed from the base 1 to facilitate the removal of the ashes 132 at the bottom of said casing. Said casing 22 may then be replaced upon the base 1, and the basket 33 recharged with carbid being placed in said casing, covered with the cap 40, the water receptacle 48 may be replaced and said members connected in rigid relation by rotation of the handle 119 until the closure 127 is returned to its closed position, shown in Fig. III. Thereupon, the generator is in condition to generate gas upon movement of the valve handle 79 to the position shown in Fig. IV, as above described.

It is to be understood that I do not desire to limit myself to the precise details of construction and arrangement above described, as it is obvious that various modifications may be made therein without departing from the essential features of my invention, as defined in the following claims.

I claim:—

1. In an acetylene gas generator, the combination with a base including a condensate trap, having a gas inlet at the top thereof and a condensate outlet and two eccentric sockets at the bottom thereof; of two branch condensing coils carried by said base; means detachably connecting said coils in communication with said trap; a carbid casing, having a central tubular column and a gas outlet at the bottom thereof, detachably fitted to said base; a water receptacle having a central tubular column and arranged to detachably fit upon said carbid casing, with said columns in registry; and means for detachably rigidly connecting said casing and receptacle with said base including a screw threaded rod depending in said water receptacle column from the top thereof, and a screw threaded stem extending in said carbid casing column from said base, in screw threaded engagement with said rod; said stem extending through said trap in said base and carrying at its lower end a closure for said condensate outlet; a handle on said rod above said water receptacle; and resilient means arranged to automatically open said closure whenever said stem is released by rotation of said rod, including two springs set in said sockets respectively encircling said studs.

2. In an acetylene gas generator, the combination with a base including a condensate trap, having a gas inlet at the top thereof and a condensate outlet; of a condensing coil carried by said base; means connecting said coil in communication with said trap; a carbid casing, having a central tubular column and a gas outlet at the bottom thereof, detachably fitted to said base; a water receptacle having a central tubular column and arranged to detachably fit upon said carbid casing, with said columns in registry; and means for detachably rigidly connecting said casing and receptacle with said base including a screw threaded rod depending in said water receptacle column from the top thereof, and a screw threaded stem extending in said carbid casing column from said base, in screw threaded engagement with said rod; said stem extending through said trap in said base and carrying at its lower end a closure for said condensate outlet; a handle on said rod above said water receptacle; and resilient means arranged to automatically open said closure whenever said stem is released by rotation of said rod.

3. In an acetylene gas generator, the combination with a base including a condensate trap, having a gas inlet at the top thereof and a condensate outlet at the bottom thereof, and an eccentric socket; of a condensing coil carried by said base in communication with said trap; a carbid casing, having a central tubular column and a gas outlet in the bottom thereof, detachably fitted to said base; a water receptacle having a central tubular column and arranged to detachably fit upon said carbid casing, with said column in registry; and means for detachably rigidly connecting said casing and receptacle with said base including a screw threaded rod depending in said water receptacle column from the top thereof, and a screw threaded stem extending in said carbid casing column from said base, in screw threaded engagement with said rod; said stem extending through said trap in said base and carrying at its lower end a closure for said condensate outlet; a handle on said rod above said water receptacle; and resilient means arranged to automatically open said closure whenever said stem is released by rotation of said rod, including a spring set in said socket encircling said stud.

4. In an acetylene gas generator, the combination with a base including a condensate trap, having a gas inlet at the top thereof and a condensate outlet at the bottom thereof, and an eccentric socket; of a carbid casing, having a central tubular column and a gas outlet at the bottom thereof, detachably fitted to said base; a water receptacle having a central tubular column and arranged to detachably fit upon said carbid casing, with said column in registry; and means for detachably rigidly connecting said casing and receptacle with said base including a screw threaded rod depending in said water receptacle column from the top thereof, and a screw threaded stem extending in said carbid casing column from said base, in screw threaded engagement with said rod; said stem extending through said trap in said base and carrying at its lower end a closure for said condensate outlet; a handle on said rod above said water receptacle; and resilient means arranged to automatically open said closure whenever said stem is released by rotation of said rod, including a spring set in said socket encircling said stud.

5. In an acetylene gas generator, the combination with a base including a condensate trap, having a gas inlet and a condensate outlet; of a carbid casing, having a gas outlet detachably fitted to said base; a water receptacle arranged to detachably fit upon said carbid casing; and means for detachably rigidly connecting said casing and receptacle with said base including a screw threaded rod depending in said water receptacle from the top thereof, and a screw threaded stem extending in said carbid casing from said base, in screw threaded engagement with said rod; said stem extending through said trap in said base and carrying at its lower end a closure for said condensate outlet; a handle on said rod above said water receptacle; and resilient means arranged to automatically open said closure whenever said stem is released by rotation of said rod.

6. In an acetylene gas generator, the combination with a base including a condensate trap, having a gas inlet and a condensate outlet; of a carbid casing, having a gas outlet detachably fitted to said base; a water receptacle arranged to detachably fit upon said carbid casing; and means for detachably rigidly connecting said casing and receptacle with said base including a screw threaded rod and a screw threaded stem in screw threaded engagement with said rod; said stem carrying at its lower end a closure for said condensate outlet; a handle on said rod; and resilient means arranged to automatically open said closure whenever said stem is released by rotation of said rod.

7. In an acetylene gas generator, the combination with a base including a condensate trap, having a gas inlet and a condensate outlet; of a carbid casing having a gas outlet detachably fitted to said base; a water receptacle arranged to detachably fit upon said carbid casing; and means for detachably rigidly connecting said casing and receptacle with said base including a screw threaded rod and a screw threaded stem in screw threaded engagement with said rod; said stem carrying at its lower end a closure for said condensate outlet.

8. In an acetylene gas generator, the combination with a carbid casing; of a water receptacle separable from said carbid casing; a condensate trap separable from said carbid casing and having a condensate outlet; a closure for said outlet; and means operatively connected with said closure adjustable to shut said closure and hold said casing, receptacle, and trap in rigid relation and to simultaneously release said casing, receptacle and trap and open said closure.

9. In an acetylene gas generator, the combination with a carbid casing; of a water receptacle separable from said carbid casing; a condensate trap separable from said carbid casing and having a condensate outlet; a closure for said outlet; and means operatively connected with said closure adjustable to shut said closure and hold said casing, receptacle, and trap in rigid relation.

10. In an acetylene gas generator, the combination with a carbid casing; of a water receptacle; a condensate trap separable from said carbid casing and having a condensate outlet; a closure for said outlet; and means, operatively connected with said closure, adjustable to shut said closure and hold said casing and trap in rigid relation.

11. In an acetylene gas generator, the combination with a carbid casing; of a water receptacle; a condensate trap having a condensate outlet; a closure for said outlet; and means, operatively connected with said closure, adjustable to shut said closure and hold said casing and trap in rigid relation.

12. In an acetylene gas generator, the combination with a carbid casing; of a condensate trap having a condensate outlet; a closure for said outlet; and means, operatively connected with said closure, adjustable to hold said casing and trap in rigid relation.

13. In an acetylene gas generator, the combination with a base including a condensate trap having a gas inlet and a condensate outlet; of a carbid casing detachably fitted to said base; and means arranged to detachably rigidly connect said carbid casing with said base, including a closure for said outlet having a screw threaded stem extending through said trap into said carbid casing, and a screw threaded rod engaging said stem.

14. In an acetylene gas generator, the combination with a base including a condensate trap having a gas inlet and a condensate outlet; of a water receptacle separable from said base; and means arranged to detachably rigidly connect said water receptacle with said base, including a closure for said outlet having a screw threaded stem, and a screw threaded rod engaging said stem.

In testimony whereof, I have hereunto signed my name at Philadelphia, Pennsylvania, this 11th day of August 1913.

EDWIN M. ROSENBLUTH.

Witnesses:
H. C. MANN,
E. G. McCULLOUGH.

Copies of this patent may be obtained for five cents each, by addressing the "Commissioner of Patents, Washington, D. C."